INVENTORS
GRAHAM JOHN SCOLES
JAMES BORLAND LYALL
Norris + Bateman
ATTORNEYS

United States Patent Office 3,066,260
Patented Nov. 27, 1962

3,066,260
PFN PROTECTIVE CIRCUIT UTILIZING PARALLELED INDUCTOR AND RESISTOR
Graham John Scoles, Bowdon, and James Borland Lyall, Manchester, England, assignors to Associated Electrical Industries (Manchester) Limited, a British company
Filed Nov. 7, 1958, Ser. No. 772,572
Claims priority, application Great Britain Nov. 12, 1957
2 Claims. (Cl. 328—65)

This invention relates to electrical pulse generating arrangements of the kind in which a pulse forming network is charged and then discharged through a load circuit by a triggered rectifying device to generate a pulse.

With such arrangements difficulties may arise if a short circuit develops due to a breakdown of the load. In such cases the pulse forming network may discharge and overswing so that it becomes negatively charged, i.e. charged in the opposite sense to that in which it is normally charged, which is referred to herein as the positive sense. The result of this is that it will re-charge in the positive sense but it is liable to re-charge to an excessive voltage with the risk of causing damage and, furthermore, the alternate charging and discharging to an excessive overvoltage may continue cumulatively without any means of controlling it and this may necessitate shutting down the equipment.

In order to avoid such occurrences it has previously been proposed to connect a reverse rectifier across the pulse forming network and load circuit, i.e. the rectifier would be connected across the triggering rectifier but in the reverse sense, and thus it would discharge the line should this become negatively charged for the reason above mentioned. However, such rectifiers which are normally diodes, have a small current carrying capacity relative to that of triggered discharge tubes and accordingly if used alone would themselves be damaged under fault conditions.

In order to limit the current through the diode and avoid this damage it has been proposed to connect a resistance in series with the diode. Such an arrangement, however, whilst protecting the diode, has a limiting effect in dissipating the reverse charge of the pulse forming network since the current must of necessity flow through the discharge circuit for a relatively long period and hence allow some excessive voltage to occur across the network on the subsequent recharge. In order to avoid this difficulty it has been proposed to employ a resistance and inductance in series with each other and with the diode so that the damped oscillation resulting from these components in association with the capacitance of the pulse forming network will cause the voltage across the switching device to change rapidly from a negative to a positive value. Hence the subsequent recharge must be to a voltage less than normal. Such an arrangement, whilst being an improvement over a circuit employing only a resistance, has the disadvantage that the current build-up tends to be sinusoidal and accordingly in cases where a rapid build-up is necessary it may not afford adequate protection.

The present invention comprises an electrical pulse generating arrangement of the kind referred to including a reverse voltage protective circuit connected across the triggering rectifying device, which protective circuit comprises a rectifier poled to pass currents in the opposite direction to the triggering rectifier, i.e. currents due to reverse voltages developed across the pulse forming network, and in series with said rectifier a current limiting circuit comprising a resistance and inductance in parallel with each other.

It will be understood that the term positive as applied to the charging of the pulse forming network implies the sense in which it is normally charged by the charging source and does not necessarily imply that a positive voltage is developed and similarly negative implies the opposite sense to positive.

It has been found that such an arrangement permits both a rapid build-up and maintenance of current through the protective diode and thus provides similar protection to the known series arrangement of resistance and inductance but, for a given degree of protection, the peak current through the diode is much less. Alternatively, for a given diode, the circuit parameters may be so chosen that the reverse charge is removed more rapidly and thus better protection is provided.

In order that the invention may be more clearly understood reference will now be made to the accompanying drawing, in which.

Figure 1:
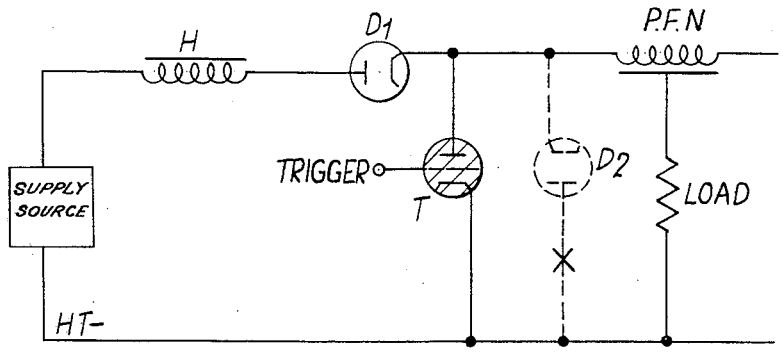
FIG. 1 shows a circuit arrangement of a known form of pulse generating circuit.

In FIG. 1 the pulse forming network PFN is charged from a supply source indicated as HT through a choke H and a charging rectifier D1. The network PFN is discharged by applying a triggering voltage to render the triggered device T (here shown as a thyratron) conductive. This discharges the pulse forming network through the load. As above mentioned, if a fault occurs in the load, e.g. due to a breakdown across a magnetron, the pulse forming network, in discharging through T, will tend to overswing and charge up negatively. Previous attempts to deal with such conditions have consisted in connecting a rectifier, as indicated by D2, to discharge the pulse forming network. As above explained, the discharge rectifier D2 has, in the prior arrangements, been either alone or in series with a resistance or with both a resistance and an inductance, here indicated by the general symbol X.

Figure 2:
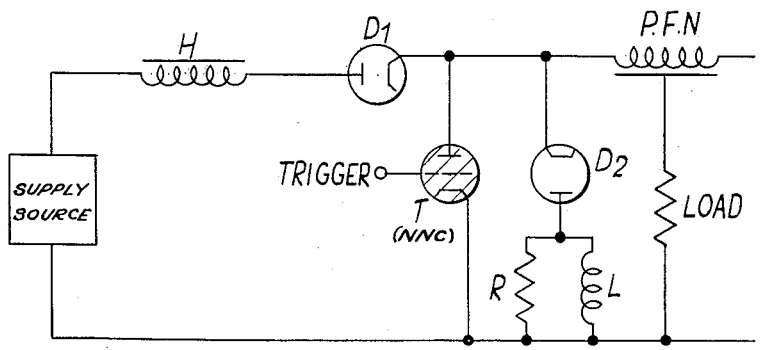
FIG. 2 shows a pulse generating circuit of the kind shown in FIG. 1 embodying the invention.

FIG. 2 shows an improved arrangement according to the present invention in which the protective circuit comprises a diode D2 in series with which is a limiting circuit comprising a resistance R and an inductance L in parallel with each other.

Figure 3:
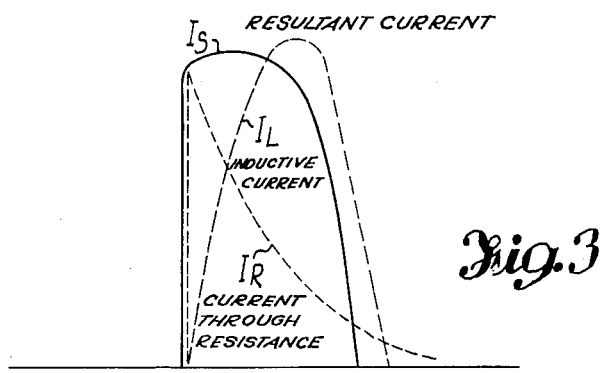
FIG. 3 illustrates graphically the currents which flow in the arrangement of FIG. 2.

The discharge currents flowing through such a circuit are shown in FIG. 3, in which $I_R$ indicates the current flowing through the resistance R alone. This, it will be observed, has a high initial peak but then falls away rapidly; in other words it has a rapid build up but the current then dies away to zero, thus using the diode most inefficiently. $I_L$ is the current through the inductance alone; this, it will be observed, has a slow build up and uses the diode rather more efficiently, as well as producing the required swing from negative to positive of the voltage across the networks. $I_S$ is the resultant current with both R and L in circuit and is rather similar to the sum of $I_R$ and $I_L$. This current, it will be observed, has the required characteristics inasmuch as it has the property of rapid build-up to an almost constant value, followed by a rapid fall to zero. Thus the maximum use is made of the current-carrying capacity of the diode D2, consistent with rapid reversal of the network voltage and hence prevention of an overvoltage on the subsequent recharge of the network.

What we claim is:

1. In an electrical pulse generating apparatus a pulse forming network, means for charging said network through a choke and a rectifier, means for discharging said network through a load circuit in combination with a protective circuit connected across said load circuit for preventing over-swing of the voltage of the pulse forming network said circuit including a rectifier and current limiting means directly connected in series, said current limiting means comprising a resistance connected in parallel with an inductance.

2. An electrical pulse generating apparatus including a pulse forming network, means for charging said pulse forming network with a predetermined polarity, a load circuit and a discharge device connected in series across said pulse forming network, means for triggering said discharge device so as to discharge said pulse forming network through said load circuit, and a protective circuit connected to the pulse forming network, said protective circuit comprising a rectifying device directly in series with a current limiting circuit formed by a resistance and an inductance connected in parallel, said rectifying device being operable to pass current from said pulse forming network whenever said pulse forming network is charged with a polarity having a sense opposite to that of said predetermined polarity.

References Cited in the file of this patent

UNITED STATES PATENTS

| | | |
|---|---|---|
| 2,659,008 | Floyd | Nov. 10, 1953 |
| 2,680,821 | Fundingsland | June 8, 1954 |
| 2,729,793 | Anderson | Jan. 3, 1956 |
| 2,743,360 | Stanton | Apr. 24, 1956 |